United States Patent Office 3,186,987
Patented June 1, 1965

3,186,987
ANTI-INFLAMMATORY 3β-HYDROXY-PREGN-4-ENE-20-ONES
Romano Deghenghi, Westmount, Quebec, and David J. Marshall, Montreal, Quebec, Canada, assignors to American Home Products Corporation, New York, N.Y., a corporation of Delaware
No Drawing. Filed Aug. 27, 1963, Ser. No. 304,973
15 Claims. (Cl. 260—239.55)

This invention relates to biologically active steroidal alcohols, their esters and ethers. It is also concerned with processes used in the preparation of these compounds from known starting materials, and with the novel intermediates used in their preparation.

More particularly it refers to biologically active pregnenolones of the following Formula I

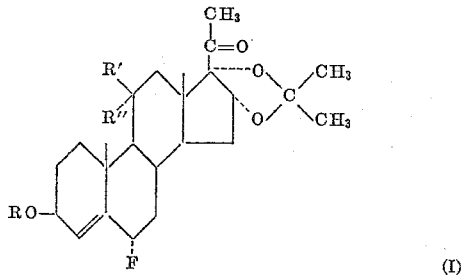

wherein R' is hydroxyl and R" is hydrogen, or together R' and R" are =O (ketonic oxygen), and R is hydrogen, lower alkyl, or acyl.

Our novel compounds may also be represented by the formula identical with the above, but written differently, as follows:

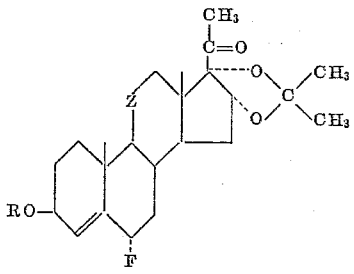

wherein Z is selected from the group the group consisting of

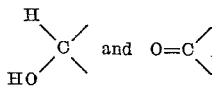

and R has the significance noted above.

The compounds of this invention are useful as anti-inflammatory agents, particularly for topical use. As such, they show a high degree of anti-inflammatory activity in a number of well-known and universally recognised tests for determining such anti-inflammatory activity. This activity is indeed surprising and unexpected, because all the compounds with anti-inflammatory activities used in therapy have the characteristic structure of Δ⁴-3-ketones of the natural corticoids. In contradistinction to those known substances, the compounds of this invention are allylic 3β-alcohols, or derivatives thereof, and do not possess the Δ⁴-3-ketone structure of the natural corticoids. Moreover, they possess the surprising and unpredictable advantage of exhibiting undesirable side effects to a lesser degree than other well-known anti-inflammatory substances.

The extent to which they cause reduction in the size and weight of the thymus gland, deposition of liver glycogen, elevation of blood sugar levels, adrenal atrophy, excretion of sodium and potassium, or protein breakdown is smaller in every instance than that obtained with known anti-inflammatory drugs. In addition the compounds of this invention also show a diminished degree of influence upon the blood picture.

The compounds of this invention may be prepared in the following manner.

6α - fluoro - 11α-hydroxy-4-pregnen-16α,17α-isopropylidenedioxy-3,20-dione (II), the preparation of which is described in our co-pending U.S. patent application Ser. No. 310,476, filed September 20, 1963, is oxidized with chromic acid to yield the corresponding trione, 6α-fluoro-16α,17α - isopropylidenedioxy - 4-pregnene-3,11,20-trione (III). The latter compound is treated with lithium aluminum tri-t-butoxyhydride, thus selectively reducing only the 3-keto group, to obtain 6α-fluoro-16α,17α-isopropylidenedioxy - 4 - pregnen - 3β - ol-11,20-dione (IV), which is acetylated in the conventional manner to yield 6α - fluoro - 3β - acetoxy - 16α,17α-isopropylidenedioxy-4-pregnene-11,20-dione (VIa). Alternatively the hydroxydiketone (IV) may also be treated with t-butylacetyl chloride in pyridine to obtain the corresponding ester, 6α-fluoro - 3β-t-butylacetoxy-16α,17α-isopropylidenedioxy-4-pregnene-11,20-dione (VIb).

Alternatively, the 3-keto group of the starting material (II) may also be selectively reduced with lithium aluminum tri-t-butoxyhydride to obtain the corresponding 3β-hydroxy compound, 6α-fluoro-16α,17α-isopropylidenedioxy-4-pregnene-3β,11α-dihydroxy-20-one (VII), the 3β-hydroxy group of which is in turn selectively methylated to yield the corresponding 3β-methyl ether, 6α-fluoro-16α,17α - isopropylidenedioxy-3β-methoxy-4-pregnen-11α-ol-20-one (VIII). The latter methyl ether is then oxidised in the conventional manner to yield 6α-fluoro-16α,17α-isopropylidenedioxy - 3β-methoxy-4-pregnene-11,20-dione (VIc).

The mother liquors from the crystallization of the hydroxydiketone (IV) contain the corresponding dihydroxyketone, 6α - fluoro - 16α,17α-isopropylidenedioxy-4-pregnene-3β,11β-dihydroxy-20-one (V), which is acetylated in the conventional manner to yield the corresponding 3β-acetoxy derivative, 6α-fluoro-3β-acetoxy-16α,17α-isopropylidenedioxy-4-pregnen-11β-ol-20-one (IXa). Alternatively, the dihydroxy-ketone (V) is treated with t-butylacetyl chloride to obtain the corresponding 3β-t-butylacetate, 6α-fluoro-3β-t-butylacetoxy-16α,17α-isopropylidenedioxy-4-pregnen-11β-ol-20-one (IXb), or its 3β-hydroxy group may be selectively methylated or reacted with n-propyl iodide to obtain the corresponding methyl or propyl ethers, 6α-fluoro-3β-methoxy-16α,17α-isopropylidenedioxy-4-pregnen-11β-ol-20-one (IXc), or 6α-fluoro-3β - propoxy-16α,17α-isopropylidenedioxy-4-pregnen-11β-ol-20-one (IXd), respectively. Oxidation of the above 11β-hydroxy compounds with Formulae IXa, b, c, and d, yields the corresponding 11-keto derivatives of Formula VIa, b, c, or d, respectively.

The following formulae and examples will illustrate our invention.

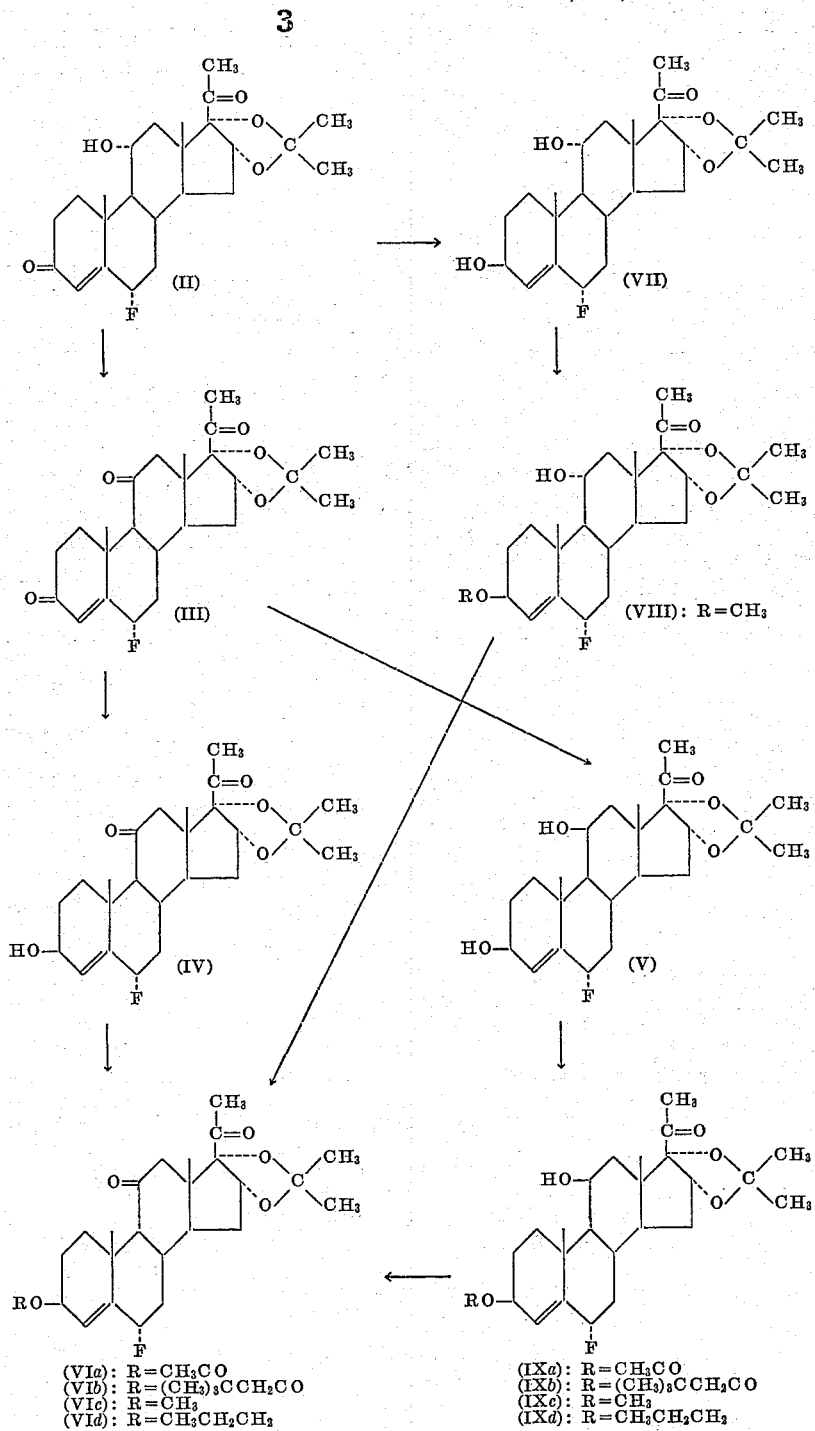

(VIa): R=CH₃CO
(VIb): R=(CH₃)₃CCH₂CO
(VIc): R=CH₃
(VId): R=CH₃CH₂CH₂

(IXa): R=CH₃CO
(IXb): R=(CH₃)₃CCH₂CO
(IXc): R=CH₃
(IXd): R=CH₃CH₂CH₂

EXAMPLE I

6α-fluoro-16α,17α-isopropylidenedioxy-4-pregnene-3,11,20-trione (III)

A quantity of 1.40 g. of 6α-fluoro - 11α - hydroxy-4-pregnen-16α,17α - isopropylidenedioxy - 3,20 - dione (see our copending application Ser. No. 310,476, filed September 20, 1963), was dissolved in 40 ml. acetone and oxidized at 0° C. with 2.8 ml. 8 N chromic acid during four minutes. The usual work-up gave 1.28 g. of the title product, M.P. 215° C. (dec.).

EXAMPLE II

6α-fluoro-16α,17α-isopropylidenedioxy-4-pregnen-3β-ol-11,20-dione (IV)

The product from Example I, 100 mg., dissolved in 2 ml. tetrahydrofuran was stirred at room temperature for 4 hours with 182 mg. of lithium-aluminum-tri-t-butoxyhydride.

The mixture was treated with a saturated solution of ammonium sulfate and extracted with methylenedichloride. Evaporation of the solvent and crystallization from ether gave the product, M.P. 143° C. (dec.).

EXAMPLE III

6α-fluoro-16α,17α-isopropylidenedioxy-4-pregnene-3β,11β-dihydroxy-20-one (V)

The mother liquors of the crystallization of the product described in Example II contained the title compound, purified by chromatography on silica-gel.

EXAMPLE IV

6α-fluoro-3β-acetoxy-16α,17α-isopropylidenedioxy-4-pregnene-11,20-dione (VIa)

The product described in Example II, 583 mg., was acetylated at room temperature for 16 hours with one ml. acetic anhydride in 5 ml. pyridine. The title compound was best purified by chromatography on silica gel. M.P. 204° C. (dec.), $[\alpha]_D^{23}$ +82° C. (CHCl$_3$).

EXAMPLE V

*6α-fluoro-3β-t-butylacetoxy-16α,17α-isopropylidenedioxy-4-pregnene-11,20-dione (VIb)*

The compound described in Example II was treated with t-butylacetylchloride in pyridine in a manner similar to that described in Example IV. The title compound was isolated by crystallization from ether.

EXAMPLE VI

*6α-fluoro-16α,17α-isopropylidenedioxy-4-pregnene-3β,11α-dihydroxy-20-one (VII)*

In a manner analogous to that described in Example II, but starting from 6α-fluoro-11α-hydroxy-4-pregnen-16α,17α-isopropylidenedioxy-3,20-dione, the title compound was obtained.

EXAMPLE VII

*6α-fluoro-16α,17α-isopropylidenedioxy-3β-methoxy-4-pregnen-11α-ol-20-one (VIII)*

The product from Example VI was treated with a catalytic amount of p-toluenesulfonic acid in a methanolic solution at room temperature for 3 hours. Partial evaporation of the solvent in vacuo and the usual work up gave the title compound.

EXAMPLE VIII

*6α-fluoro-16α,17α-isopropylidenedioxy-3β-methoxy-4-pregnene-11,20-dione (VIc)*

The product from Example VII was oxidized in the usual manner with chromic oxide in pyridine at room temperature to give the title compound.

EXAMPLE IX

*6α-fluoro-3β-acetoxy-16α,17α-isopropylidenedioxy-4-pregnen-11β-ol-20-one (IXa)*

In a manner similar to that described in Example IV but starting from the product of Example III, the title compound was secured.

EXAMPLE X

*6α-fluoro-3β-t-butylacetoxy-16α,17α-isopropylidenedioxy-4-pregnen-11β-ol-20-one (IXb)*

Starting from product of Example III, the title compound was obtained in a manner similar to that of Example V.

EXAMPLE XI

*6α-fluoro-3β-methoxy-16α,17α-isopropylidenedioxy-4-pregnen-11β-ol-20-one (IXc)*

The title compound was obtained essentially in the way described in Example VII but starting from the product of Example III.

EXAMPLE XII

*6α-fluoro-3β-propoxy-16α,17α-isopropylidenedioxy-4-pregnen-11β-ol-20-one (IXd)*

Alkylation of the product described in Example III with n-propyliodide in the usual manner, afforded the title compound.

EXAMPLE XIII

*6α-fluoro-3β-propoxy-16α,17α-isopropylidenedioxy-4-pregnene-11,20-dione (VId)*

The product from Example XII was oxidized with chromic anhydride in pyridine in the conventional manner at room temperature and the title compound was thereby secured.

We claim:
1. Pregnenolone derivatives of the formula

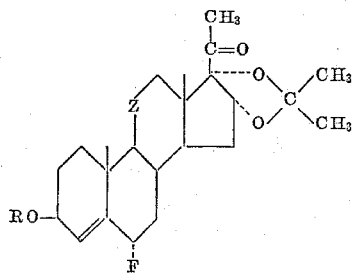

in which Z is selected from the group consisting of

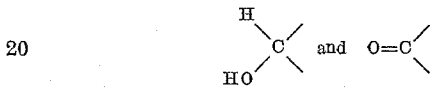

and R is selected from the group consisting of hydrogen, lower alkyl, and lower alkanoyl.

2. Pregnenolone derivatives of the formula

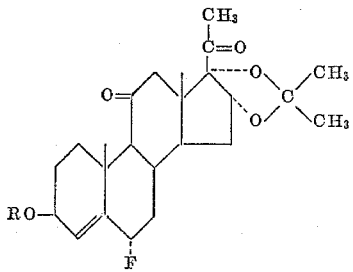

in which R is selected from the group consisting of hydrogen, lower alkyl, and lower alkanoyl.

3. Pregnenolone derivatives of the formula

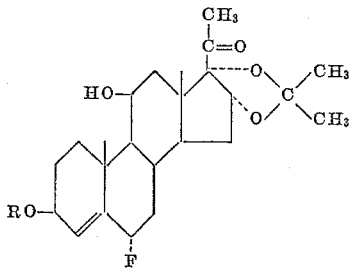

in which R is selected from the group consisting of hydrogen, lower alkyl, and lower alkanoyl.

4. 3β-acetoxy-6α-fluoro-16α,17α-isopropylidenedioxy-4-pregnene-11,20-dione.

5. 3β-t-butylacetoxy-6α-fluoro-16α,17α-isopropylidenedioxy-4-pregnene-11,20-dione.

6. 6α-fluoro-16α,17α-isopropylidenedioxy-3β-methoxy-4-pregnene-11,20-dione.

7. 6α-fluoro-16α,17α-isopropylidenedioxy-3β-propoxy-4-pregnene-11,20-dione.

8. 3β-acetoxy-6α-fluoro-11β-hydroxy-16α,17α-isopropylidenedioxy-4-pregnen-20-one.

9. 3β-t-butylacetoxy-6α-fluoro-11β-hydroxy-16α,17α-isopropylidenedioxy-4-pregnen-20-one.

10. 6α-fluoro-11β-hydroxy-16α,17α-isopropylidenedioxy-3β-methoxy-4-pregnen-20-one.

11. 6α-fluoro-11β-hydroxy-16α,17α-isopropylidenedioxy-3β-propoxy-4-pregnen-20-one.

12. 6α-fluoro-3β-hydroxy-16α,17α-isopropylidenedioxy-4-pregnene-11,20-dione.

13. 3β,11β-dihydroxy-6α-fluoro-16α,17α-isopropylidenedioxy-4-pregnen-20-one.

14. 3β,11α-dihydroxy-6α-fluoro-16α,17α-isopropylidenedioxy-4-pregnen-20-one.

15. 6α-fluoro-11α-hydroxy-16α,17α-isopropylidenedioxy-3β-methoxy-4-pregnen-20-one.

References Cited by the Examiner

UNITED STATES PATENTS 2,838,545  6/58  Magerlein et al. _____ 260—397.45

OTHER REFERENCES

Fried et al.: J.A.C.S. 80, pages 2338–39 (1958).

LEWIS GOTTS, *Primary Examiner*.